United States Patent [19]

Whyte et al.

[11] 4,025,655

[45] May 24, 1977

[54] BEVERAGE CARBONATION DEVICES

[75] Inventors: David D. Whyte, Wyoming; Ronald L. Sampson, North College Hill, both of Ohio

[73] Assignee: The Procter & Gamble Company, Cincinnati, Ohio

[22] Filed: Oct. 4, 1976

[21] Appl. No.: 729,617

Related U.S. Application Data

[60] Division of Ser. No. 488,594, July 15, 1974, Pat. No. 3,992,493, which is a division of Ser. No. 302,149, Nov. 30, 1972, Pat. No. 3,888,998, which is a continuation-in-part of Ser. No. 200,849, Nov. 22, 1971, abandoned.

[52] U.S. Cl. .................................. 426/66; 426/77; 426/82; 426/86; 426/91; 426/115; 426/590
[51] Int. Cl.[2] ...................... A23L 2/40; A23L 2/00; B65B 29/06; B65B 29/10
[58] Field of Search ................ 426/66, 67, 77, 78, 426/82, 86, 91, 271, 590, 591, 592, 477; 252/455.2; 261/121 R, DIG. 7

[56] References Cited

UNITED STATES PATENTS

| | | | |
|---|---|---|---|
| 2,022,467 | 11/1935 | Heyman | 426/78 |
| 2,330,884 | 10/1943 | Harriman | 426/78 |
| 2,742,363 | 4/1956 | Hughes | 426/591 |
| 2,882,244 | 4/1959 | Milton | 252/455.2 |
| 2,972,406 | 2/1961 | Mayer | 416/86 |
| 3,065,054 | 11/1962 | Haden et al. | 252/455.2 |
| 3,202,275 | 8/1965 | Loughary | 426/86 |
| 3,213,164 | 10/1965 | Freeman et al. | 264/101 |
| 3,234,028 | 2/1966 | Dunham et al. | 252/455.2 |
| 3,441,417 | 4/1969 | Feldman et al. | 426/591 |
| 3,476,520 | 11/1969 | Hovey | 99/275 |

*Primary Examiner*—Steven L. Weinstein
*Attorney, Agent, or Firm*—Leonard Williamson; Lawrence J. Klich; Louis G. Xiarhos

[57] ABSTRACT

Beverage carbonation devices employing carbon dioxide-containing molecular sieves. Upon contact with aqueous solutions carbon dioxide is released from such molecular sieves and thereupon dissolves in the liquid to provide a carbonated beverage.

23 Claims, 13 Drawing Figures

U.S. Patent May 24, 1977 Sheet 4 of 5 4,025,655
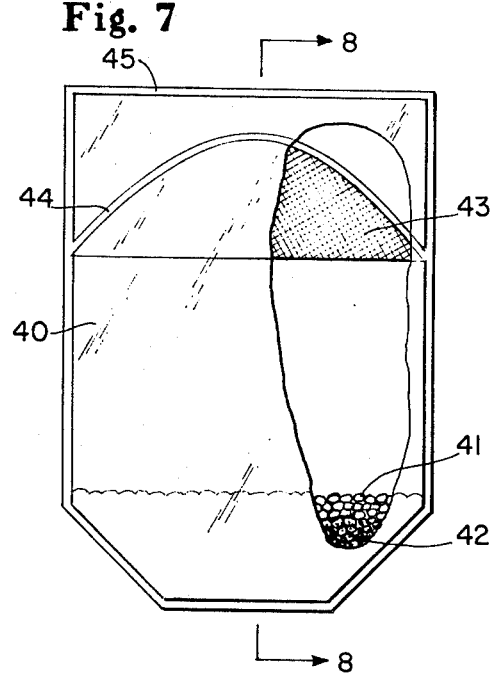
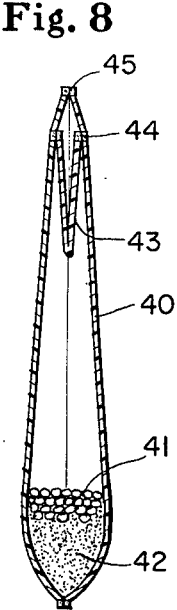
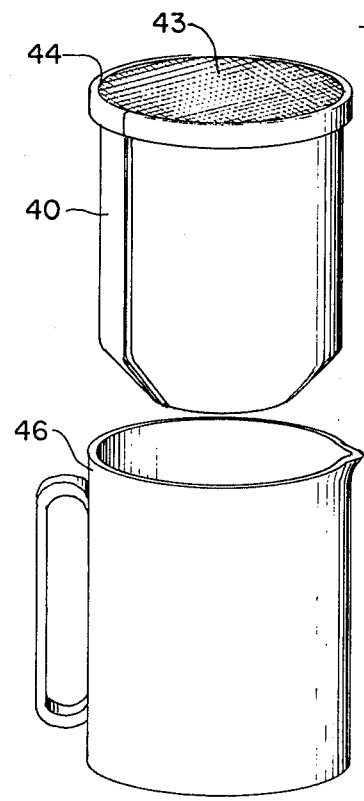

BEVERAGE CARBONATION DEVICES

CROSS REFERENCE TO RELATED APPLICATIONS

This application is a divisional of commonly assigned, co-pending application, Ser. No. 488,594, filed July 15, 1974. now U.S. Pat. No. 3,992,493, which issued Nov. 16, 1976, which application in turn is a divisional of commonly assigned, then co-pending application, Ser. No. 302,149, filed Nov. 30, 1972, now U.S. Pat. No. 3,888,998, which issued June 10, 1975, which application in turn is a continuation-in-part of commonly assigned, then co-pending application, Ser. No. 200,849, filed Nov. 22, 1971, and now abandoned.

This invention relates to methods, compositions and devices for the carbonation of aqueous beverages at the point of consumption. Carbonation is accomplished by contacting the beverage to be carbonated with "molecular sieves", i.e., crystalline aluminosilicates, which contain absorbed gaseous carbon dioxide. Carbon dioxide is released from such molecular sieves by displacement with water from the beverage solution. The liberated carbon dioxide is then dissolved by the liquid to form the carbonated beverage.

Commercial beverage carbonation usually involves carbon dioxide-liquid contact under pressure with intensive mixing in a cooled container. Such commercial methods, of course, require elaborate and sophisticated equipment not available in the home or at the point of beverage consumption.

Several simple carbonation techniques which are suitable for home use have been disclosed in the art. Most commonly, such prior art carbonation systems utilize a chemical "couple" to generate carbon dioxide in situ within the beverage to be carbonated. Such a couple usually consists of the combination of an inorganic carbonate such as sodium bicarbonate and an edible food acid such as citric acid or an acid-acting ionic exchange resin. Contact between compounds of this type in aqueous solution results in the formation of gaseous carbon dioxide and a salt of the food acid. Several patents (Mitchell et al., U.S. Pat. No. 3,241,977, March 22, 1966; Mitchell et al., U.S. Pat. No. 3,467,526, Sept. 16, 1969; Hovey, U.S. Pat. No. 3,492,671, Jan. 27, 1970; and Hughes, U.S. Pat. No. 2,742,363, Apr. 17, 1956) describe preferred embodiments of such acid-bicarbonate or acid resin-bicarbonate systems in detail. All of these methods, however, result in formation of undesirable off-tasting organic salts in solution or require utilization of complex ion exchange material to prevent these salts from dissolving in the beverage. Such salts are particularly noticeable and objectionable to the consumer when formed in substantial amounts in achieving relatively high levels of carbonation.

Another home carbonation technique utilizes dry beverage compositions containing water-reactive carbonic acid anhydrides which release $CO_2$ or $H_2CO_3$ in aqueous solution. (Feldman et al., U.S. Pat. No. 3,441,417, Apr. 29, 1969). These compositions, however, require rather complex formulation and, in many instances, require incorporation of a buffering system into the beverage solution.

Accordingly, it is an object of the present invention to provide a simple method for beverage carbonation which can be employed in the home or at the point of consumption. It is a further object of the instant invention to provide such a simple carbonation method which does not result in undesirable build-up of off-tasting organic salts in solution. It is a further object of the present invention to provide such a beverage carbonation method which does not necessitate formulation of complex dry carbonation compositions. It is a further object of the instant invention to provide simple but effective devices for point-of-consumption beverage carbonation.

It has now been discovered that by employing readily available molecular sieves which contain absorbed carbon dioxide and which readily release such carbon dioxide upon contact with water, the above-described objectives can be accomplished.

SUMMARY OF THE INVENTION

The instant invention provides methods, compositions and devices for making carbonated beverages in the home. In general such methods comprise contacting a beverage liquid with an effective amount of a crystalline aluminosilicate molecular sieve material having absorbed therein at least about 5% by weight of carbon dioxide. Such carbonation takes place at a temperature below about 110° F and at a pressure at least about one atmosphere. Compositions and devices particularly useful when effectuating such molecular sieve carbonation are also provided.

DESCRIPTION OF THE DRAWINGS

Although the specification concludes with claims particularly pointing out and distinctly claiming the subject matter forming the present invention, it is believed that the same will be better understood by reference to the following specification taken in connection with the accompanying drawings in which:

FIG. 2 is a graph which demonstrates 4-minute carbonation performance factors as a function of molecular sieve pore size. The horizontal axis represents molecular sieve pore size in Angstroms. The vertical axis represents four-minute carbonation performance factors, a performance factor being a unitless number defined as:

$$\left[ \frac{\text{(Volume of } CO_2 \text{ dissolved after four minutes)}}{\text{(Volume of } CO_2 \text{ dissolved at saturation)}} \right] \times \left[ \frac{\text{(Volume of } CO_2 \text{ dissolved after four minutes)}}{\text{(Volume of } CO_2 \text{ available within the sieves used)}} \right]$$

The two curves represent 12 gram and 24 gram batches of molecular sieves which were used to carbonate 8 fluid ounces of water at 35° F and one atmosphere.

Figure 3:
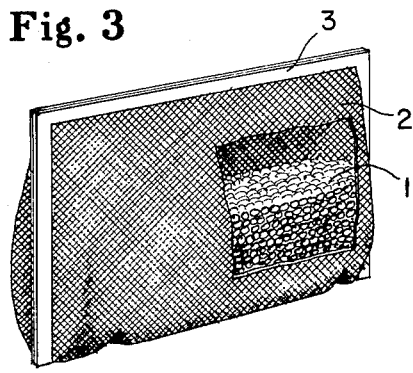
Figure 4:
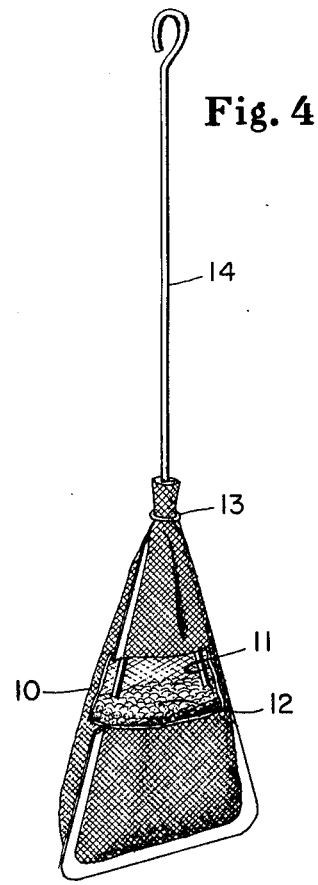

FIG. 3 is a perspective view of a "teabag type" of beverage carbonation device. FIG. 4 is a perspective view of a "swizzle stick" or structured teabag type of carbonation device.

Figure 5:
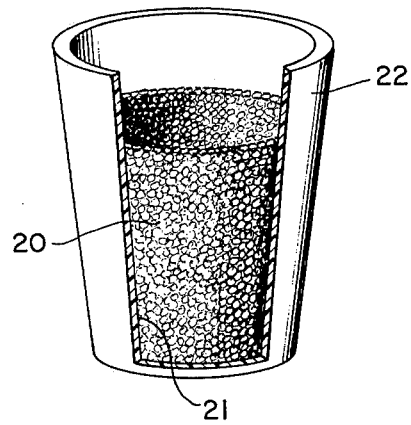
Figure 6:
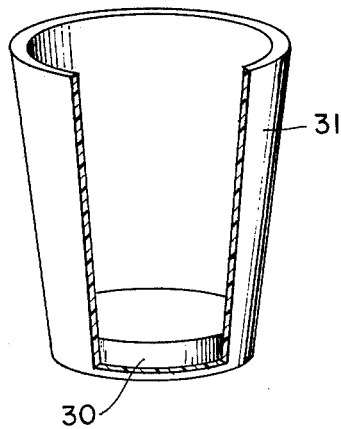

FIG. 5 is a partial cutaway perspective view of a drinking vessel which can be used to prepare a carbonated beverage. FIG. 6 is a cutaway perspective view of another type of drinking vessel which can be used to prepare a carbonated beverage.

FIG. 7 is an elevational view of a sealed flexible carbonation chamber device which upon opening can be used to prepare a carbonated beverage.

FIG. 8 is a vertical cross-sectional view of the sealed carbonation chamber of FIG. 7.

FIG. 9 is a perspective view of the flexible carbonation chamber of FIGS. 7 and 8 opened and ready for preparation of a carbonated beverage.

Figure 10:
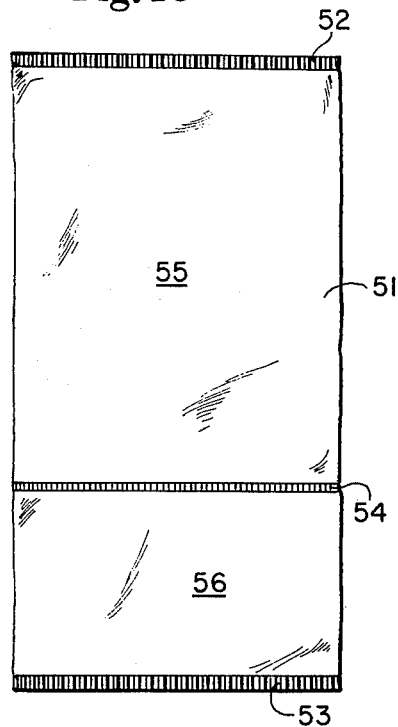

FIG. 10 is an elevational view of a two compartmented bag carbonation device of the present invention.

Figure 11:
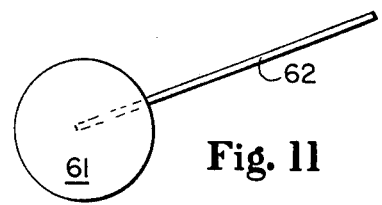

FIG. 11 is a perspective view of another carbonation device of the present invention.

Figure 12:
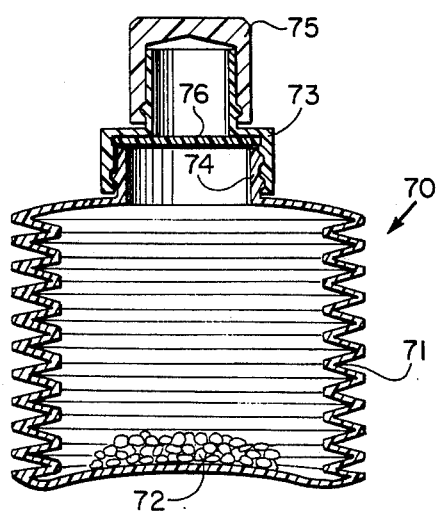

FIG. 12 is a vertical cross-sectional view of a collapsible container/carbonation device of the present invention in the collapsed form.

Figure 13:
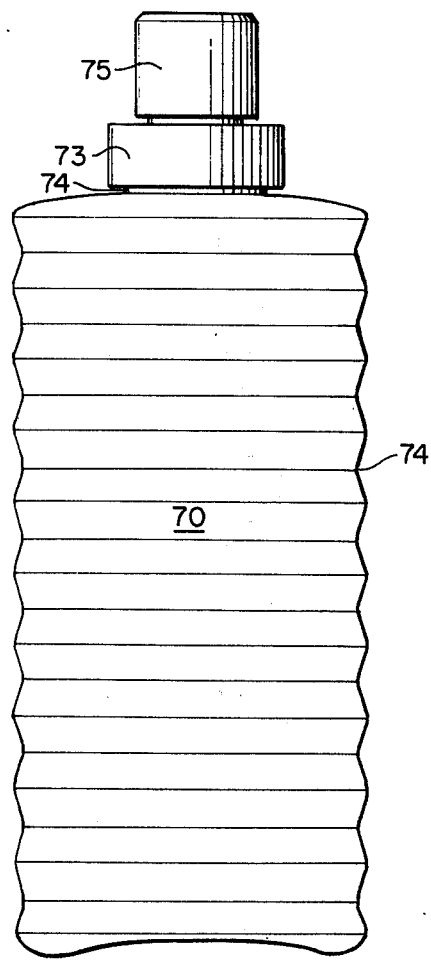

FIG. 13 is an elevational view of the container of FIG. 12 in the in-use position.

DETAILED DESCRIPTION OF THE INVENTION

The instant invention utilizes carbon dioxide-containing molecular sieves to effectuate carbonation of an aqueous potable solution. The invention comprises a process for beverage carbonation in this manner and compositions and devices for carrying out this process.

Molecular sieves of the type used in this invention are crystalline aluminosilicate materials of the following general formula:

$$M_{2/n}O \cdot SiO_2 \cdot aAl_2O_3 \cdot bH_2O$$

in the salt form, where $n$ is the valence of a metal cation M, M ordinarily is Na or K but may be other cations substituted by exchange, $a$ is the number of moles of alumina and $b$ is the number of moles of water of hydration.

Upon removal of at least some of the water of hydration by heating, the crystalline aluminosilicates become highly porous and are characterized by a series of surface cavities and internal pores which form an interconnecting network of passageways within the crystal. Such dehydrated molecular sieves are often referred to as "activated," meaning that they are ready to absorb carbon dioxide. Due to the crystalline nature of such materials, the diameters of the surface cavities and of the internal pores are substantially constant and are of molecular magnitude. For this reason, the crystalline aluminosilicates have found wide use in the separation of materials according to molecular size or configuration, hence the name molecular sieves.

Molecular sieves or crystalline aluminosilicates are also sometimes referred to as crystalline zeolites and are of both natural and synthetic origin. Natural crystalline aluminosilicates exhibiting molecular sieve activity include for example, analcite, paulingite, ptilolite, clinoptilolite, ferrierite, chabazite, gmelinite, levynite, erionite and mordenite.

Since not all of the natural crystalline aluminosilicates are available in abundance, considerable attention has been directed to the production of synthetic equivalents. Two basic types of crystalline aluminosilicate molecular sieves most readily available on a commercial scale have been given the art-recognized designations of "Zeolite X" and "Zeolite A". Other molecular sieves which have been synthesized include Zeolites B, F, G, H, K-G, J, L, M, K-M, Q, R, S, T, U, Y, and Z.

Zeolite X is described, together with a process for making it, in detail in U.S. Pat. No. 2,882,244, incorporated herein by reference. The general formula for Zeolite X, expressed in terms of mole fractions of oxides, is as follows:

$$0.9 \pm 0.2 M_{2/n}O : Al_2O_3 : 2.5 \pm 0.5 SiO_2 : 0 \text{ to } 8 H_2O$$

In the formula M represents a metal and $n$ its valence. As noted, the zeolite is activated or made capable of absorbing certain molecules by the removal of water from the crystal as by heating. Thus the actual number of moles of water present in the crystal will depend upon the degree of dehydration or activation of the crystal.

The metal represented in the formula above by the letter M can be changed by conventional ion exchange techniques. The sodium form of the Zeolite X, designated sodium Zeolite X, or simply as a NaX molecular sieve, is the most convenient to manufacture. For this reason the other forms of Zeolite X are usually obtained by the modifications of sodium Zeolite X.

A typical formula for sodium Zeolite X is $$0.9 Na_2O : Al_2O_3 : 2.5 \ SiO_2 : 6.1 \ H_2O$$

After activation by heating, at least some of the water is removed from the sodium Zeolite X or other molecular sieve material and it is then ready for use in the instant invention.

The major lines in the X-ray diffraction pattern of sodium Zeolite X are set forth in Table A below.

TABLE A

| d Value of Reflection in Å. | $100 I/I_0$ |
|---|---|
| 14.42 ± 0.2 | 100 |
| 8.82 ± 0.1 | 18 |
| 4.41 ± 0.05 | 9 |
| 3.80 ± 0.05 | 21 |
| 3.33 ± 0.05 | 18 |
| 2.88 ± 0.05 | 19 |
| 2.79 ± 0.05 | 8 |
| 2.66 ± 0.05 | 8 |

In obtaining the X-ray diffraction powder patterns, standard techniques are employed. The radiation is the K doublet of copper, and a Geiger counter spectrometer with a strip chart pen recorder is used. The peak heights, I, and the positions as a function of 2θ where θ is the Bragg angle, are read from the spectrometer chart. From these, $d$ (obs.), the interplanar spacing in A., corresponding to the recorded lines is calculated. The X-ray patterns indicate a cubic unit cell of dimensions between 24.5 A. and 25.5 A.

To make sodium Zeolite X reactants are mixed in aqueous solution and held at about 100° C. until the crystals of Zeolite X are formed. Preferably the reactants should be such that in the solution the following ratios by weight prevail:

$SiO_2/Al_2O_3$ 3.5
$Na_2O/SiO_2$ 1.2 – 1.5
$H_2O/Na_2O$ 35 – 60

The manner in which Zeolite X can be obtained is illustrated by the following: 10 grams of $NaAlO_2$, 32 grams of an aqueous solution containing by weight about 20% $Na_2O$ and 32% $SiO_2$, 5.5 grams of NaOH and 135 cubic centimeters of $H_2O$ are mixed and held in an autoclave for 47 hours at about 100° C. Crystalline sodium Zeolite X is recovered by filtering the reacted materials and washed with water until the pH of the effluent wash water is between 9 and 12. The crystals are then at least partially dried after which they are ready for use in the instant invention.

Zeolite A is described in detail together with processes for its preparation in U.S. Pat. No. 2,882,243, incorporated herein by reference. The general formula for Zeolite A, expressed in terms of mole fractions of oxides is as follows:

$$1.0\pm0.2\ M_{2/n}O:Al_2O_3:1.85\pm0.5SiO_2:0\ to\ 6\ H_2O$$

In the formula M represents a metal, hydrogen, or ammonium, N the valence of M. The amount of $H_2O$ present in Zeolite A will of course depend on the degree of dehydration of the crystals.

As in the case of Zeolite X and other zeolites, the element or group designated by M in the formula can be changed by conventional ion exchange techniques. Sodium Zeolite A is the most convenient form to prepare, and other forms are usually obtained from it by an exchange of ions in aqueous solutions. A typical formula for sodium Zeolite A is $$0.99\ Na_2O:1.0\ Al_2O_3\cdot1.85\ SiO_2:5.1\ H_2O$$

The removal of at least part of the water, as by heating, would be sufficient to prepare the sodium Zeolite A for use in the instant invention.

Using the techniques by which the X-ray diffraction data for Sodium Zeolite X was obtained, similar data for sodium Zeolite A is obtained and is recorded in Table B.

TABLE B

| d Value of Reflection in Å. | 100 $I/I_o$ |
|---|---|
| 12.2 ± 0.2 | 100 |
| 8.6 ± 0.2 | 69 |
| 7.05 ± 0.15 | 35 |
| 4.07 ± 0.08 | 36 |
| 3.68 ± 0.07 | 53 |
| 3.38 ± 0.06 | 16 |
| 3.26 ± 0.05 | 47 |
| 3.96 ± 0.05 | 55 |
| 2.73 ± 0.05 | 12 |
| 2.60 ± 0.05 | 22 |

To make sodium Zeolite A reactants are mixed in aqueous solution and held at about 100° C. until crystals of sodium Zeolite A are formed. The reactants should be such that in the solution the following ratios prevail:

$SiO_2Al_2O_3$ 1.2 – 2.5
$Na_2O/SiO_2$ 0.8 – 3.0
$H_2O/Na_2O$ 35 – 200

An example of the manner in which sodium Zeolite A may be prepared is as follows: 80 grams of $NaAlO_2$, 126 grams of an aqueous solution of sodium silicate containing about 7.5% by weight $Na_2O$ and 25.8% by weight $SiO_2$, and 320 cubic centimeters of $H_2O$ are placed in an autoclave. In the autoclave the following ratios prevail: $SiO_2/Al_2O_3$, 1.2; $Na_2O/SiO_2$, 1.2; and $H_2O/Na_2O$, 36. The contents of the autoclave are held at about 100° C. for about 12 hours. Crystalline sodium Zeolite A is recovered by filtration and washed with distilled water until the effluent wash water has a pH of between 9 and 12. After drying and at least partial dehydration the crystals are ready for use in the instant invention.

These and other types of crystalline aluminosilicate molecular sieves useful in the instant invention are described more fully in the following publications incorporated herein by reference: Hersh, *Molecular Sieves*, Reinhold Publishing Corporation, 1961; Thomas and Mays, "Separations with Molecular Sieves" found at pages 45–97 of *Physical Methods in Chemical Analysis, Volume IV*, edited by Walter G. Berl, Academic Press, 1961; Breck, "Crystalline Molecular Sieves", found at page 678 of the *Journal of Chemical Education, Volume* 41, December, 1964; and "Linde Molecular Sieves," a technical publication of the Union Carbide Corporation.

Several specific types of molecular sieves are particularly useful for employment in the instant beverage carbonation process and devices. (In the following description, references to molecular sieves by "Types" all refer to materials presently available from the Molecular Sieve Department of Union Carbide. Generic designations such as NaA, NaX, CaA, CaX refer respectively to sodium Zeolite A, sodium Zeolite X, calcium Zeolite A, calcium Zeolite X, etc.). These include Type 4A and 13X molecular sieves. Type 4A (NaA) has a 4 Angstrom pore size and can be characterized by the chemical formula $$Na_{12}[(AlO_2)_{12}(SiO_2)_{10}]\cdot 27\ H_2).$$

Type 13X (NaX) has a 10 Angstrom pore size and can be characterized by the chemical formula $$Na_{86}\ [(AlO_2)_{86}(SiO_2)_{106}]\cdot 276H_2O.$$

With both the Type 4A and 13X molecular sieves, the sodium ions can be exchanged with other cations, such as potassium and calcium, to provide varying pore sizes and somewhat different absorption characteristics. For example, the Type 4A molecular sieve having approximately 705 of its sodium cations exchanged for calcium cations yields a molecular sieve marketed commercially by the Union Carbide Corp. as Type 5A (CaA) having a 5 Angstrom pore size. Likewise, the Type 13X (NaX) molecular sieve having about 70% of its sodium cations exchanged for calcium cations is marketed commercially by the Union Carbide Corporation as the Type 10X (CaX) having an 8 Angstrom pore size. Another molecular sieve, the Type 3A has a potassium Zeolite A (KA) structure and a 3 Angstrom pore size.

It is also possible to commercially obtain crystalline aluminosilicate molecular sieves which are classified as "acid-resistant". Acid-resistant molecular sieves are crystalline zeolites which do not structurally degrade and from which metal ions are not leached upon prolonged contact with low pH solutions. Such acid-resistant molecular sieves are usually prepared by removing or replacing with protons many of the exchangeable metal ions found in natural and synthetic molecular sieves. This is accomplished by first exchaning metal ions with ammonium ions and subsequently heating the resulting ammonium form of such molecular sieves to about 400° C. to decompose the ammonium cations. Although the exchangeable metal ions in all crystalline metal aluminosilicates can be removed or replaced to some extent by this procedure, in most cases complete ion exchange of this type destroys the drystal structure of the zeolite. In order to replace more than 35% of the zeolite metal ions without destroying the aluminosilicate crystal, those zeolites having a $SiO_2/Al_2O_3$ molar ratio greater than 3:1 are employed in the above-described ion exchange processes. Zeolites having such a high $SiO_2/Al_2O_3$ mole ratio include the natural mineral faujasite and the synthetic sodium Zeolite Y (NaY) described more described more fully in U.S. Pat. No. 3,130,007, incorporated herein by reference. Zeolite Y has the general formula $(0.9\pm0.2)$ $Na_2O \cdot Al_2O_3 \cdot cSiO_2 \cdot dH_2O$ wherein $c$ varies from 3 to 6 and $d$ (before dehydration) is less than or equal to 9. The process for lowering the metal ion content of crystalline metal aluminosilicates is described more fully in U.S. Pat. No. 3,130,006 and 3,460,904 incorporated herein by reference.

Examples of commercially available acid-resistant molecular sieves produced by the metal ion removal process described above include the Type AW-300 molecular sieve which has a 4 Angstrom pore size, the Type AW-500 molecular sieve which has a 5 Angstrom pore size, the Type SK40 (NaY in particulate form with a clay binder) and Type Sk41 (NaY in particulate form) molecular sieves both having a pore size of 8–10 Angstroms and the Zeolon Series 100, 200 and 900, presently marketed by the Norton Company.

Various molecular sieve forms ranging from powder (0.5 – 12 microns) to ¼ inch spheres are commercially available, with most of the non-powdered forms incorporating a binder of inert clay at a 20% by weight level. Common sieve forms include extruded 1/16 and ⅛ inch diameter pellets and 4 × 8 and 8 × 12 mesh beads, i.e., spheres which will pass through an 8 mesh screen but not through a 12 mesh screen. Molecular sieves may be placed in other molded forms of any size or shape desired with binders of clay or polymeric resins.

For purposes of the instant invention, the material absorbed within such molecular sieves is, of course, gaseous carbon dioxide. Carbon dioxide is strongly absorbed on such sieves, but is readily displaced by the stronger and preferential absorption of water. Hence, the release of absorbed carbon dioxide from molecular sieves in aqueous solution provides basis for the carbonation technique of the instant invention.

Molecular sieves are "loaded" with carbon dioxide merely by contacting the activated (i.e., at least partially dehydrated) sieve material with gaseous carbon dioxide under anhydrous conditions to bring about carbon dioxide absorption. Typically, the sieve materials can be dehydrated to about 2% by weight water. Preferably, molecular sieves are charged with carbon dioxide in a packed bed column to which the gas is passed in ambient temperature and at a slight positive pressure (up to 0.5 psig). For use in the instant beverage carbonation process and devices, molecular sieves should be loaded to the extent of at least about 5% by weight (i.e., weight of carbon dioxide absorbed/weight of loaded sieves × 100%). The extent to which a particular size of sieves, i.e., sieves with a given pore size, absorb carbon dioxide at any particular temperture or pressure is easily determined by experimentation or by utilization of absorption data provided for commercially available sieves.

It is important that the carbon dioxide-loaded molecular sieves be packaged and stored in a manner which will prevent contact with atmospheric moisture prior to use in the present invention. Such atmospheric moisture would displace carbon dioxide rendering the sieves ineffective for beverage carbonation.

The carbon dioxide-loaded molecular sieves are contacted with aqueous potable liquid to effectuate the carbonation process of the instant invention. Carbon dioxide is released from the sieves by the preferential adsorption of water from the beverage solution. A carbonated beverage results when this released carbon dioxide is dissolved in the aqueous liquid. Subsequent release of this dissolved carbon dioxide in the mouth upon drinking provides the characteristic feel and taste of a carbonated beverage. Of course, the extent of carbonation increases as more carbon dioxide is dissolved. Carbonation is usually measured in a unit, hereinafter referred to as "volumes of dissolved $CO_2$" or "volumes of carbonation" defined as the volume of gas (reduced to standard conditions, i.e., 760 mmHg and 32° F.) which at the temperature and pressure of carbonation is dissolved in a given volume of beverage.

For purposes of evaluating various molecular sieve carbonation systems, another carbonation indicator known as a performance factor, $P_n$, can be defined and expressed as the following formula:

$$P_n = (A_n)(B_n)$$

wherein $A_n$ is an effectiveness factor defined as the ratio $$\left( \frac{\text{Volume of } CO_2 \text{ dissolved at } n \text{ carbonation minutes}}{\text{Volume of dissolved } CO_2 \text{ at saturation}} \right)$$

and $B_n$ is an efficiency factor, defined as the ratio $$\left( \frac{\text{Volume of } CO_2 \text{ dissolved at } n \text{ carbonation minutes}}{\text{Total volume of } CO_2 \text{ available within the sieves used}} \right)$$

The performance factor combines the fraction of saturation obtained (effectiveness) with the efficiency of carbonation for a given time period. In the most ideal case, $A_n$ would be unity if a saturated solution were generated and greater than unity if supersaturation resulted. $B_n$ would be unity if all the carbon dioxide present goes into solution. Therefore, the larger the performance factor, the more preferred a given molecular sieve carbonation system is. This performance factor is used to identify and evaluate essential sieve parameters and beverage solution characteristics of the instant invention.

The solubility of carbon dioxide in aqueous solution is strongly a function of temperature and pressure. Solubility data under various temperature and pressure conditions can easily be determined from prior art literature. Thus, certain temperature and pressure limitations apply to the carbonation process of the instant invention. The solubility of carbon dioxide in pure water approaches 0.5 volumes of dissolved $CO_2$ (a weakly carbonated beverage) at approximately 110° F. and 1 atmosphere. Accordingly, carbonation temperatures above 110° F. are not desirable in the practice of the present invention. There is no theoretical lower temperature limit for the instant carbonation process, but there is, of course, the practical lower limit of the freezing point of the particular aqueous beverage solution being carbonated. A highly preferred carbonation temperature is that of an ice-containing beverage mixture, i.e., approximately 32° F.

Likewise, beverage carbonation with molecular sieves becomes unacceptably inefficient at carbonation pressures below one atmosphere. Carbonation pressures above one atmosphere enhance carbon dioxide solubility and render molecular sieve beverage carbonation especially effective. In one of its aspects, therefore, the present process encompasses carbonation in closed vessels wherein pressures of up to about 10 atmospheres are developed. From the practical standpoint of in-home or point-of-consumption carbonation, however, atmospheric pressure, i.e., open container carbonation, is preferred in many instances.

Carbonation time is important in many applications but is not a critical variable in the instant carbonation process. Time of contact of the loaded molecular sieves with beverage liquid will naturally vary with the amount of aqueous solution present; the nature of that solution; the amount, type, and level of charge of the molecular sieves employed; and the "strength" of carbonated beverage desired. By employing molecular sieves loaded with carbon dioxide to the extent of at least 5% by weight and by carbonating at temperature and pressure conditions of the present invention, suitably carbonated beverages can be obtained after typical in-home carbonation times (2-15 minutes). Carbonation systems providing carbon dioxide release for longer or shorter times than typical can be achieved by utilizing preferred embodiments of the instant invention described hereinafter.

Figure 1:
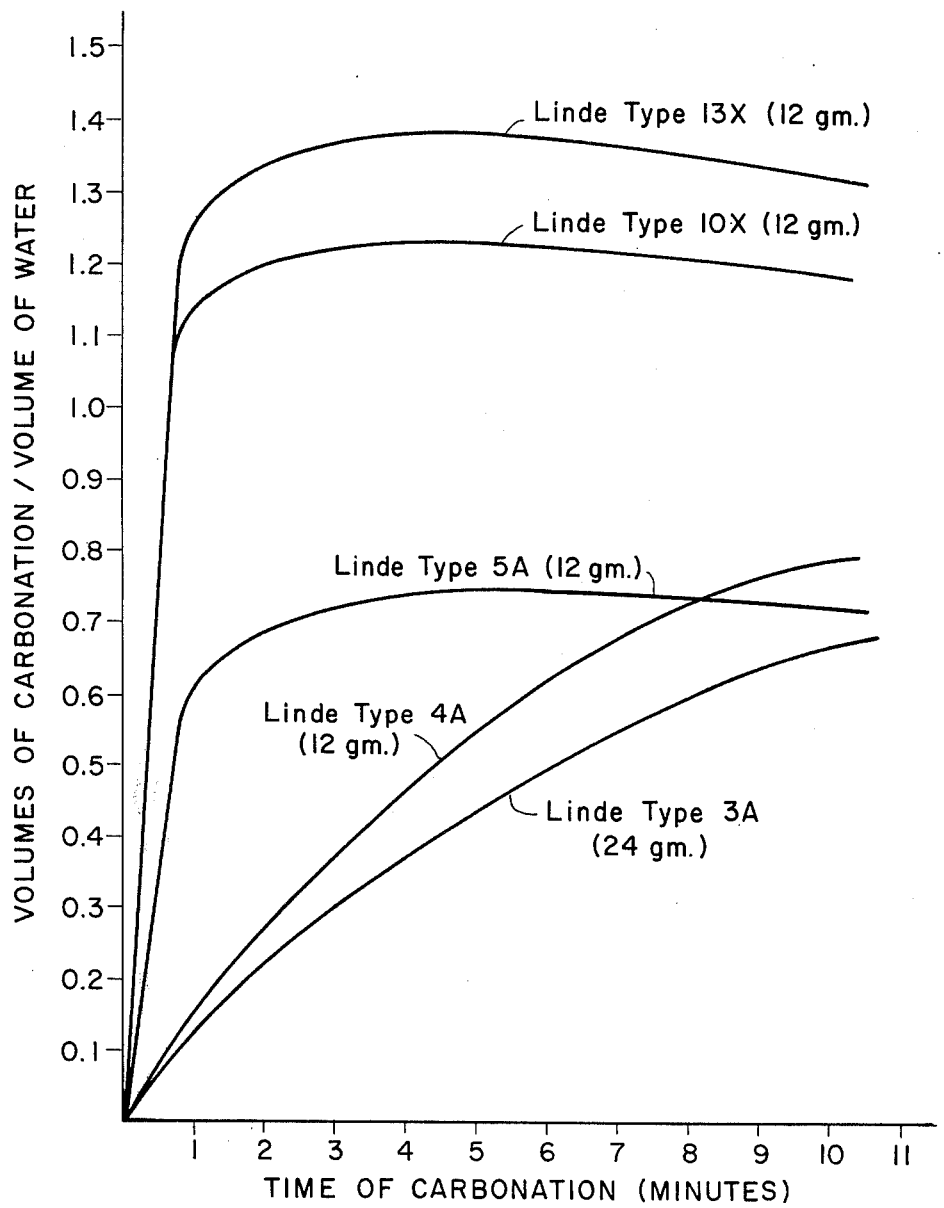
FIG. 1 is a graph which demonstrates the effect of molecular sieve pore size on carbonation of water. The horizontal axis represents carbonation time in minutes. The vertical axis represents a unitless measure of dissolved carbon dioxide expressed as the volume of gaseous carbon dioxide (at 32° F. and 1 atmosphere) dissolved per volume of carbonated liquid (at 35° F. and 1 atmosphere). The five curves are carbonation profiles at 35° F and one atmosphere obtained from five different types of molecular sieves which are presently available commercially from the Molecular Sieve Department of the Material Sciences Division (formerly the Linde Division) of the Union Carbide Corporation.
Figure 2:
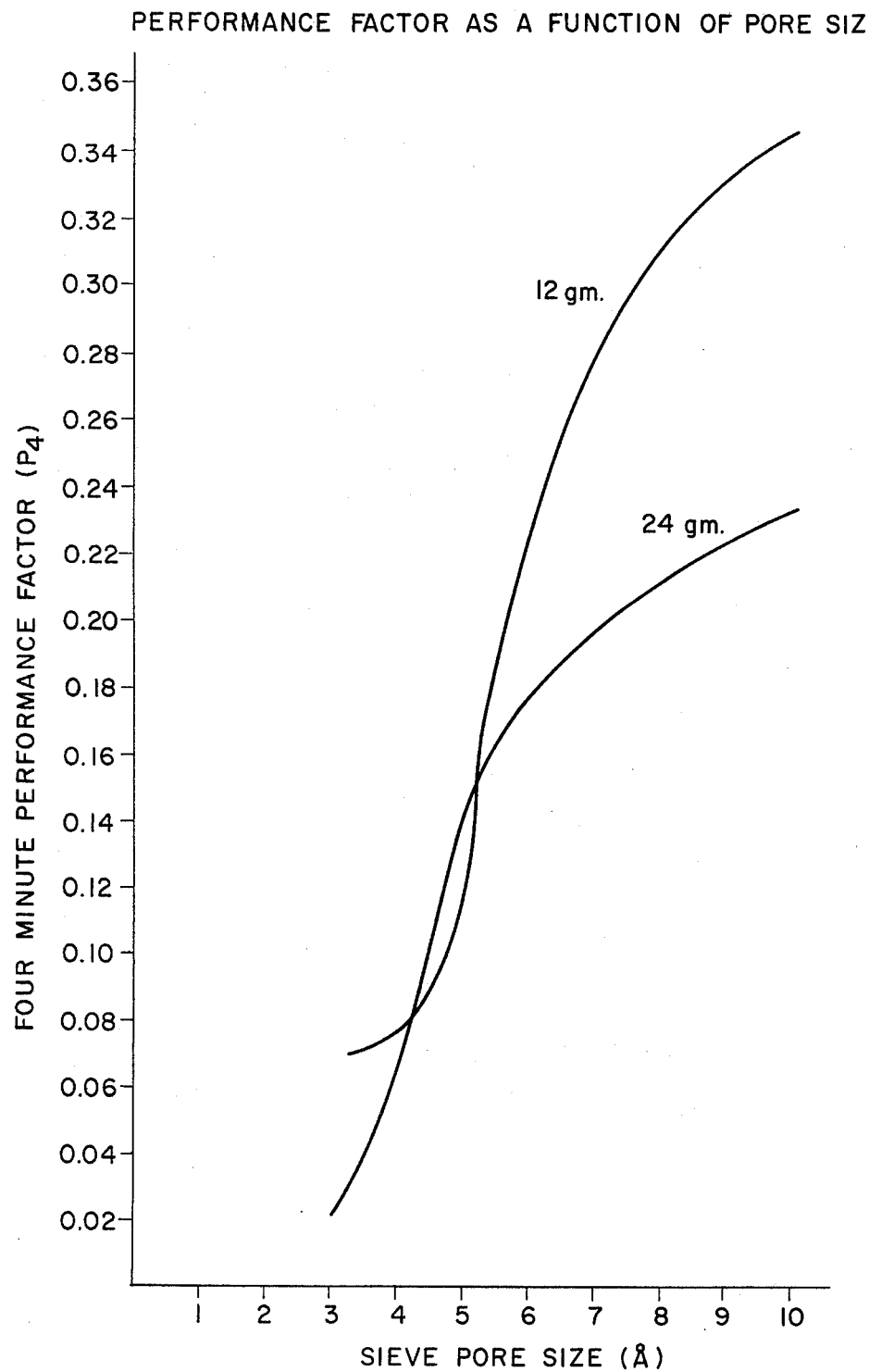

Varying the pore size of the molecular sieves employed in the instant process affects both the carbonation rate and final carbonation level. This is demonstrated by the typical data shown in FIG. 1 of the drawings. Performance factors at a typical carbonation time (four minutes) generally increase with increasing pore size as illustrated by FIG. 2 of the drawings. The curves of FIGS. 1 and 2 are representative of data obtained from actual sieve tests wherein data were gathered from carbonating eight ounces of cool water at atmospheric pressure with varying weights of 3, 4, 5, 8 and 10 Angstrom pore sized molecular sieves Types 3A, 4A, 5A, 10X and 13X, respectively. Each type of sieve was loaded with carbon dioxide to the maximum extent practical utilizing as received activated sieves; viz., 7.9 10.8, 11.7, 10.9 and 13.2% by weight respectively. As can be seen the larger sieve types, particularly those of 8-10 Angstrom pore size exhibit higher 4 minute performance ($P_4$) and consequently are preferred.

As might be expected, increasing the quantity of molecular sieves employed for a given amount of beverage solution increases the quantity of carbon dioxide released, even though carbonation efficiency decreases markedly with an increase in the total amount of molecular sieves present. Although the optimum amount of molecular sieves employed varies with the characteristics of the sieves utilized and the beverage solution to be carbonated, the preferred quantity of molecular sieves ranges from about 0.5 to about 4 grams (before loading) of molecular sieves per fluid ounce of beverage to be carbonated.

The physical shape or form of the molecular sieves employed can also affect beverage carbonation. Powdered molecular sieves are preferably employed in the instant process by molding such sieves into any suitable form which provides a large ratio of surface area to volume. This may be done by employing porous binder systems to mold or extrude the sieves into such shapes as pellets, spheres or thin disks. Processes for bonding or molding molecular sieves into various forms are well known in the art and are disclosed, for example, in U.S. Pat. Nos. 3,158,597, 3,213,164, British Pat. No. 994,908 and Belgian Pat. No. 627,185, all of which are herewith incorporated by reference.

Mixtures of molecular sieves can be employed to obtain particular carbonation characteristics desired. In general, molecular sieve types having smaller pore sizes (3-5 Angstroms and particularly 3-4 Angstroms) release carbon dioxide upon contact with water more slowly but continue to release it for a longer period of time. Molecular sieves having larger pore openings (greater than 6 Angstroms) provide relatively high initial release rates of carbon dioxide, but such release is not sustained over longer periods of time. The ability of an aqueous solution to dissolve carbon dioxide is inversely related to the degree of saturation thereof. During initial carbonation carbon dioxide can be dissolved at a comparatively high rate while lower rate prevail as the solution approaches saturation. Accordingly, systems wherein both high initial carbon dioxide release and sustained carbon dioxide dissolution are desired can be realized by employing mixtures of sieves having varying pore sizes. A preferred sustained-release carbonation process employs a mixture of molecular sieves wherein from 30 to 70 by weight of the sieve mixture consists of sieves having ore sizes from 3 to 5 Angstroms, and preferably 3 to 4 Angstroms, with the balance of the molecular sieves employed having pore sizes from about 6 to 10 Angstroms.

In some applications it may be desirable to use a mixed molecular sieve/chemical couple system. Chemical couples are generally less expensive per volume of released carbon dioxide than are molecular sieves. The off-flavor of the salts from carbon dioxide releasing chemical couples are barely noticeable, if at all, in low levels (which vary with the chemicals in the couple, the flavorings in the beverage and the acuity of the consumer). Typically, about 0.5 to 0.75 volume of dissolved carbon dioxide (a weakly carbonated beverage) can be achieved in a carbonated cola beverage via a chemical couple without achieving undesirably high levels of (i.e., noticeable off-flavors due to) salts. Consequently a desirable way to achieve carbonation is with a low level of chemical couple carbonation supplemented by molecular sieve carbonation. In such a mixed system, the molecular sieves will preferably be of the smaller pore size variety (i.e., about 3 to 5 Angstroms for slow release) to complement the fast release chemical couple.

The type of beverage solution to be carbonated by the process of the instant invention is not critical. The beverage liquid must, of course, be aqeuous in nature. Such liquids can contain in addition to water, any type of non-interfering flavorant, coloring agent, food additive, medicine, or alcohol. Such materials can alternatively be premixed with carbon dioxide loaded molecular sieves forming compositions which can be used to form flavorful carbonated beverage from tap water. In still another variation, flavorings and colorings can be be provided in an aqeuous mixture which is added to water along with the carbon dioxide loaded sieves.

Examples of the types of beverage which can be made from suitable liquids by carbonation with the present invention include soft drinks, medicinal preparations, beer and sparkling wine.

Certain solutes which might be present in beverage solutions can, however, affect carbon dioxide dissolution, and certain preferred embodiments of the instant invention are particularly useful when such solutes are involved. Although artificial sweeteners such as saccharin and saccharin-containing compositions appear to have little effect on molecular sieve beverage carbonation, various natural sweeteners retard the rate and extent of carbonation from molecular sieves. For example, fructose, sucrose and glucose at levels of typical soft drink beverages noticeably inhibit carbonation of beverages containing them. It has been surprisingly discovered, however, that for carbonation of solutions fructose or glucose, 10 Angstrom molecular sieves in the form of 4 × 8 mesh beads provide much better carbonation rate results than with comparable solutions containing sucrose.

The presence of the common food acid components, such as citric acid, up to the level of about 1% appears to have very little effect on the rate or extent of beverage carbonation by molecular sieve techniques. Such food acid containing drinks, however, necessarily are rather low pH solutions (a 1% aqeuous citric acid solution, for example, has a pH of b 2). Prolonged contact of such solutions with many synthetic molecular sieve materials will result in gradual leaching of metal ions from the sieve material. As a result the pH of such beverages may rise to the extent that noticeable flavor changes occur. Accordingly when food acid-containing beverage liquids are being carbonated in accordance with the process of the instant invention, it is preferred to utilize acid-resistant molecular sieves described above, i.e., crystalline metal aluminosilicates having an $SiO_2/Al_2O_3$ molar ratio of at least 3 which have had at least 35% of the exchangeable metal ions removed or replaced with protons.

When carbon dioxide is released quickly in the solution from molecular sieves, it is not generally as efficiently dissolved as when release rates are slower. Slower release rates in general provide better opportunity for gas-liquid contact and therefore promote carbon dioxide dissolution. Dissolution can thus generally be enhanced by utilizing some means for controlling the rate of carbon dioxide release from the molecular sieve material. As noted above, one method of reducing the rate of carbon dioxide displacement by water from molecular sieves resides in employing at least some molecular sieves having pore sizes of from 3 to 5 Angstroms. Another means for controlling and retarding carbon dioxide release rate from molecular sieves comprises coating such sieves with a water-soluble material that impedes water entry into the carbon dioxide-containing molecular sieve channels as the coating is being dissolved. Any non-toxic, water-soluble coating compound such as polyvinyl alcohol, polyvinyl pyrrolidone, or hydroxypropyl cellulose is suitable. Readily available hydroxypropyl cellulose is the preferred coating.

As noted, carbon dioxide release rate can also be controlled by employing different forms of molecular sieves. Variation in the volume to surface ratio of the aluminosilicate material has a marked effect on carbon dioxide displacement from the molecular sieves. In general sieves having a higher volume to surface area release carbon dioxide more slowly and over a longer time period than sieves having a lower volume to surface ratio.

Carbonation in accordance with the instant invention can, of course, be accomplished by any method of contacting molecular sieves with the beverage liquid. Generally, loaded molecular sieves are placed in a container, and the liquid to be carbonated is then added in sufficient amount to cover the sieves. Unless very fine, impalpable, nontoxic, consumable molecular sieve powder is utilized, carbonation in this manner necessitates separation of the molecular sieve material from the beverage liquid before consumption. This can be done, for example, by filtration, straining, decanting of the beverage or withdrawal of the sieve material from the carbonation vessel. In order to eliminate the need for filtration or straining, several beverage carbonation devices for employing the molecular sieve carbonation process of the instant invention are provided. Each of the devices described can be used with carbon dioxide loaded sieves alone (with a pre-flavored beverage) or in combination with various flavorings and additives (with tap water or the like).

The simplest device for employing the molecular sieve beverage carbonation process of the instant invention comprises a water and gas permeable container in which molecular sieves and, if desired, dry beverage mix, can be enclosed. An overwrap of material substantially impervious to water and water vapor is used to protect this and the other devices illustrated and described except the embodiments of FIGS. 5–7, 10 and other embodiments which are effectively sealed prior to use. The container is removed from its overwrap and submerged in the beverage to be carbonated with the container preventing the molecular sieve material from being dispersed in the beverage.

Preferably such containers are in the form of a flexible net of inert material, such as cloth, nylon, paper, polyester, fiberglass or any other water-insoluble synthetic polymeric material, having mesh openings large enough to permit substantially unimpeded escape of carbon dioxide bubbles and small enough to retain the molecular sieves (in whatever form utilized) inside the netting. Thus if 4 × 8 beads are employed, netting having a mesh size (number of openings per linear inch) greater than 8 must be utilized. Likewise for 8 × 12 beads, netting larger than 12 mesh must be employed. One satisfactory material for this application is the open mesh polymeric netting presently available from Hercules, Inc., under the trademark Delnet.

An example of such a container is shown by FIG. 3 in the drawing. Carbon dioxide-loaded molecular sieves, 1, are enclosed in an open mesh netting, 2, which has been closed by heat-sealing the seams, 3. If desired, colorings and flavorings in dry bead form can also be disposed within such a water and gas permeable container.

Another device for carbonating beverages in accordance with the instant invention comprises a water and gas permeable container of the type described above affixed to a frame and handle assembly so that movement of the molecular sieve-containing, gas-permeable container can be controlled below the surface of the liquid being carbonated. This structured container can then be used to agitate the beverage solution during carbonation, thereby enhancing dissolution of released carbon dioxide. An example of this type of structured "swizzle stick" is shown by FIG. 4 in the drawing. Open mesh netting, 10, encloses a triangular frame, 11, and contains carbon dioxide-loaded molecular sieves, 12. The netting is sealed by a ring, 13, at the juncture between the triangular frame the stirring handle, 14. Again beads of dry colorings and flavorings can be mixed with the molecular sieves, allowing the formation of a flavorful carbonated beverage from tap water.

Carbonation devices can also be constructed having molecular sieve material comprising an element of a beverage container itself. For example, standard drinking vessels can be employed for this purpose by affixing to the inside surfaces thereof, powdered, pelleted or beaded molecular sieves. Generally, the sieves are dispersed over such area of the inside surfaces as will be contacted by the liquid beverage when the container is filled. By distributing molecular sieves in this manner, carbon dioxide is released into solution in many different places. Carbon dioxide bubbles thus travel through a large volume of liquid, thereby greatly enhancing dissolution in the beverage.

Attachment of sieves can be accomplished by employing any inert insoluble adhesive, such as paraffin or epoxy resins. If the drinking vessel is plastic in nature, sieves can be adhered to the heat-softened inside surfaces of the vessel, to be affixed in place upon cooling. Such drinking vessels can also contain dry beverage mix flavorings and colorings in addition to molecular sieve material, allowing the creation of flavorful carbonated beverages from tap water.

An example of this type of beverage carbonation device is illustrated by FIG. 5 in the drawing. Beads of molecular sieve material, 20 are adhered or anchored to the inside surface, 21, of a drinking cup or container, 22.

Molecular sieves can also be affixed directly to drinking vessels by first molding the sieve material into solid forms which fit the contour of the vessels and which, when affixed to the inside of the vessels, present their surface area to be covered and contacted by the beverage liquid. Manufacture of such molded sieve forms using inert binders of clay or polymeric resins is known in the art as discussed above. The forms themselves may be attached to the inside surfaces of the drinking vessel by utilizing any inert insoluble adhesive material or by employing as vessels, containers which by their form or shape retain such molded sieve forms in place beneath the surface of the contained beverage. By varying the thickness of the sieve forms between about 0.001 and 3 inches, containers can be manufactured which provide various carbonation rates when filled with liquid. Again, the drinking vessel can also contain dry beverage mix.

An example of this type of carbonation device is shown by FIG. 6 in the drawing. A bonded disc of molecular sieve powder, 30, is placed at the bottom of a flexible drinking container, 31, and held in place by an insoluble adhesive or simply by pressing the disc into the bottom of the conical flexible cup.

Another type of molecular sieve carbonation device comprises an open top carbonation chamber filled with loaded molecular sieves. A screening means is affixed within the carbonation chamber to prevent escape therefrom of the solid molecular sieve particles. Beverage liquid is placed into the carbonation chamber, resulting in carbonation thereof upon contact with the loaded molecular sieves within the chamber. After carbonation is complete, the beverage is consumed or poured from the chamber. The screening means prevents molecular sieve particles and, in some cases, foam from being consumed or decanted with the beverage.

The carbonation chamber can be rigid or flexible and made from any inert, water-insoluble material. If a flexible chamber is employed, support means for holding the chamber during carbonation can also be employed. The chamber can also be sealable for storage and shipping.

The screening means can be constructed of any inert, water-insoluble material. As before, the mesh of the screen can be of any size which will readily pass liquid through but which will block passage of the insoluble molecular sieve particles employed. The screening means can be affixed in the carbonation chamber in any desired position or location. For example the screening means can be used to retain molecular sieve material at the bottom of a drinking vessel or can be placed across the top or mouth of the carbonation chamber.

The carbonation chamber device can contain in addition to carbon dioxide-loaded molecular sieve material, a dry beverage mix. If such a beverage mix is employed, only water need be added to the carbonation chamber to produce the flavored, carbonated beverage.

An example of a flexible, sealable carbonation chamber assembly is shown by FIGS. 7, 8 and 9 in the drawing. A flexible watertight bag, 40, is filled with carbon-dioxide containing molecular sieves, 41, and dry beverage mix, 42. A flexible screen or net, 43, in the form of a circle is affixed with a heat-sealed seam, 44, across the opening of the bag near the top. The edges of the bag above the flexible screen are heat-sealed in another seam, 45, to render the bag air- and water-tight for storage. In order to use the carbonation device, the top edge of the closed bag including the heat-sealed seam, 45, is torn off and the bag opened as shown in FIG. 9. The bag is then positioned inside the handled container, 46, with the top edges of the bag being folded over the lip of the handled container. Water is poured through the netted opening of the bag to prepare the carbonated beverage. The beverage can then be poured from the bag and container with the netting acting to screen the spent molecular sieve particles and foam as the beverage is decanted.

FIG. 10 is an elevational view of a package, 50, which can be used in various ways in conjunction with the instant invention. The package will typically be constructed of any suitable flexible water and water vapor impervious material, 51, such as polyethylene, polypropylene or the like which is heat sealed at the top in the region, 52, and at the bottom in the region, 53. A medial transverse seal, 54, divides the package into compartments, 55 and 56. In one application, the package, 50, can contain carbon dioxide loaded molecular sieves in one compartment and a beverage concentrate including flavorings and colorings in the other compartment. Preferably the beverage concentrate will be in liquid form due to the ease with which this form mixes with water. In this application, both compartments of the package, 50, are opened and the contents are placed in a container with a suitable amount of water. The carbonation process, i.e., the generation and migration of bubbles of carbon dioxide provides sufficient agitation to thoroughly mix the resultant beverage when a liquid beverage mix is used. Separation of the spent molecular sieves from the beverage being consumed is effected in any of the aforementioned ways.

In another application, the package, 50, is provided with a medial seal which can be peeled or otherwise opened to place the two compartments 55 and 56 in communication without destroying the integrity of the material, 51. Known techniques are available for forming such a weak seal. In this execution one compartment contains a fully diluted (i.e., at the correct strength for drinking) uncarbonated beverage. The other compartment contains carbon dioxide loaded sieves. (Alternatively the beverage flavorings and colorings can be included in dry form with the molecular sieves.) In either event, opening the medial seam, 54, allows contact between the loaded sieves and water and the consequent carbonation of the beverage. Again a water and gas pervious bag or the like can and preferably will be used to retain the spent sieves. With a suitably designed package, 50, pressure carbonation up to about two atmospheres pressure, with the associated higher levels of dissolved carbon dioxide can be achieved. Also, the convenience of a light weight flexible easily storable container can be made available to the carbonated beverage market without the flavor disadvantages of pure chemical couple systems. Pre-carbonated beverages, as opposed to point-of-use carbonated beverages cannot be provided in simple flexible packages, of course, due to the tendency of such pre-carbonated beverages to become "flat" as the carbon dioxide diffuses through the package walls.

FIG. 11 is a perspective view of an alternate carbonating device, 60, in which a disc, 61, of carbon dioxide loaded molecular sieve material with suitable binder, preferably insoluble, is adhered to or molded around support member, 62, which can be a rod-like member, making the device, 60, an alternate to the "swizzle-stick" of FIG. 4. Alternatively, the support member can be a flexible member such as a string, allowing the disc, 61, to be placed in the beverage to be carbonated much as a teabag is placed in a cup of tea. With either of these variations, the disc, 61, can also include dry flavorings and colorings as coatings thereon to allow information of a flavorful carbonated beverage from water.

FIG. 12 is a vertical cross section of another carbonation device of the present invention. The container, 70, is of plastic material and includes a plurality of circumferential pleats, 71, which allow vertical expansion of said container to the in-use configuration shown in FIG. 13. Such a container, 70, encloses a suitable quantity of carbon dioxide loaded molecular sieves, 72, which are preferably in the bead or pellet form and, optionally, coloring and flavoring ingredients. For shipment and storage the container, 70, is held in the collapsed form of FIG. 12 by any suitable means such as a plastic shrink-film overwrap.

When it is desired to prepare a carbonated beverage the shrink-film is removed. The pouring spout, 73, is then disengaged from the neck, 74, of the container, 70, (typically a threaded engagement) and removed therefrom along with the overcap, 75. A piece of the aforementioned Delnet material, 76, or any other means for retaining the molecular sieves within the container, 70, covers the inlet to the pouring spout, 73, and preferably is attached thereto.

The liquid to be carbonated (and optionally flavored and colored) is then placed within the container, 70, along with ice if desired. The pressure of the contained beverage forces the pleats, 71, to unfold and the container, 70, to expand to the configuration shown in FIG. 13. The pourspout, 73, overcap, 75, and Delnet material, 76, are then reconnected to the neck, 74, of the container, 70. When the carbonated beverage is ready for consumption, the overcap, 75 (which tyically is snap-fit to the pourspout, 73) is removed and the beverage dispensed.

All of the above-described carbonation devices employ an effective amount of crystalline aluminosilicate molecular sieves containing at least 5% by weight of carbon dioxide. Preferably such sieves have a pore size of from about 3 to about 10 Angstroms, and are present to the extent of from about 0.5 to about 4 grams of unloaded molecular sieves per fluid ounce of beverage to be carbonated. Mixtures of sieves having varying pore sizes as described above may also be employed in these carbonation devices.

The following Examples serve to illustrate the beverage carbonation process, compositions and devices of the instant invention. In each of the Examples a sample of a potable aqueous solution is carbonated using molecular sieves charged with carbon dioxide. All of the molecular sieves employed are "loaded" in a packed bed column through which a carbon dioxide is passed at ambient temperature and at a pressure of about 0.5 psig. In the Examples the volume of carbon dioxide actually dissolved in a given liquid sample is determined gravimetrically by driving the carbon dioxide out of solution by heating and carrying it with a nitrogen purge into an absorbing bed of Ascarite, commercially available sodium hydroxide on asbestos.

EXAMPLE I

Several 8 fluid ounce samples of pure water were carbonated with molecular sieves of varying pore size. All of the molecular sieves employed were in the form of molded particles incorporating clay binders. Carbonation in every case took place in a 400 ml. beaker held at a temperature of 36° ± 1° F. in an ice bath. The particular type of sieves employed, the extent to which they were charged with carbon dioxide and the amout of sieves employed are summarized in Table 1 below.

Table 1

| Sieve Type | Pore Size (Ångstroms) | Average Loading Level (Wt. $CO_2$ Wt. Loaded Sieves × 100%) | Amount Utilized (Grams) |
|---|---|---|---|
| Type 3A | 3 | 8.5 | 24 |
| Type 4A | 4 | 12.1 | 12 |
| Type 5A | 5 | 13.4 | 12 |
| Type 10X | 8 | 14.1 | 12 |
| Type 13X | 10 | 15.9 | 12 |

Volumes of carbonation attained after 1, 2, 3, 4, 6, 10 and 20 minutes were measured in separate carbonation runs. The results are the basis of FIG. 1 of the drawings and summarized in Table 2 below.

Table 2

| Sieve Type | Pore Size (Ångstroms) | Time of Carbonation (minutes) | Volumes of Carbonation |
|---|---|---|---|
| 3A | 3 | 1 | 0.146 |
| | | 3 | 0.300 |
| | | 6 | 0.360 |
| | | 10 | 0.750 |
| | | 20 | 0.595 |
| 4A | 4 | 1 | 0.212 |
| | | 3 | 0.307 |
| | | 6 | 0.826 |
| | | 10 | 0.560 |
| | | 20 | 0.795 |

Table 2-continued

| Sieve Type | Pore Size (Ångstroms) | Time of Carbonation (minutes) | Volumes of Carbonation |
|---|---|---|---|
| 5A | 5 | 1 | 0.682 |
|  |  | 2 | 0.767 |
|  |  | 4 | 0.672 |
|  |  | 6 | 0.643 |
|  |  | 10 | 0.743 |
| 10X | 8 | 1 | 1.210 |
|  |  | 2 | 1.230 |
|  |  | 4 | 1.180 |
|  |  | 6 | 1.120 |
|  |  | 10 | 1.200 |
| 13X | 10 | 1 | 1.30 |
|  |  | 2 | 1.31 |
|  |  | 4 | 1.38 |
|  |  | 10 | 1.31 |

Substantially similar carbonation results are obtained when in Example I the Type 4A molecular sieves are replaced with the acid-resistant Type AW-300 molecular sieves and the Type 5A molecular sieves are replaced with the acid-resistant Type AW-500 molecular sieves.

EXAMPLE II

Four-minute performance factors for 12 and 24 gram sieve batches of the 3 Angstrom, 4 Angstrom, 5 Angstrom, 8 Angstrom and 10 Angstrom molecular sieves were calculated by carrying out water carbonation in accordance with the procedure described in Example I above. Molecular sieves in each case were loaded with carbon dioxide to the extent shown in Table 1 above. Results of such 4 minute performance factor comparisons are the basis of FIG. 2 of the drawings and are summarized in Table 3 below.

Table 3

| Sieve Pore Size (Ångstroms) | Four-Minute Performance Factors | |
|---|---|---|
|  | 12 gram charged sieves | 24 gram charged sieves |
| 3 |  | 0.023 |
| 4 | 0.075 | 0.073 |
| 5 | 0.116 | 0.141 |
| 8 | 0.307 | 0.210 |
| 10 | 0.347 | 0.233 |

EXAMPLE III

Type 13X, 8×12 mesh beads loaded with carbon dioxide to the extent of 15.9% by weight were used to carbonate water in accordance with the procedures of Example I. Six gram, 12 gram and 24 gram samples were used, and the volumes of carbonation obtained were recorded for each sample in separate carbonation runs after 1, 2, 4, 6 and 10 carbonation minutes. Results of such carbonation are summarized in Table 4 below.

Table 4

| Time (Minutes) | Volumes of Carbonation | | |
|---|---|---|---|
|  | 6 gram batch | 12 gram batch | 24 gram batch |
| 1 | 0.77 | 1.10 | 1.40 |
| 2 | 0.91 | 1.32 | 1.54 |
| 4 | 0.99 | 1.32 | 1.95 |
| 6 | 0.98 | 1.47 | 1.37 |
| 10 | 0.95 | 1.47 | 1.77 |

EXAMPLE IV

Type 13X, 8 × 12 beads were again employed to carbonate water in accordance with the procedures of Example III. Four-minute effectiveness factors, efficiency factors, and performance factors were recorded for a 6 gram, a 12 gram, and a 24 gram batch of molecular sieves loaded with carbon dioxide to the extent of 15.9% by weight. These results are summarized in Table 5 below.

Table 5

| Comparison of Four-Minute Performance Factors For Various Batch Quantitites of 8 × 12, 13X Beads | | | | |
|---|---|---|---|---|
| Quantity (Grams) | Quantity Per Unit of Solution (Grams/Fluid Ounce) | Effectiveness Factor ($A_4$) | Efficiency Factor ($B_4$) | Performance Factor ($P_4$) |
| 6 | 0.75 | 0.611 | 0.521 | 0.318 |
| 12 | 1.5 | 0.855 | 0.363 | 0.310 |
| 24 | 3.0 | 0.994 | 0.212 | 0.211 |

Example III and IV demonstrate that even though more carbon dioxide is released into solution by utilizing larger amounts of sieves, the efficiency of carbonation decreases markedly with an increase in total amount of sieve present. Performance factors are therefore optimized by employing from about 0.75 to 1.5 grams of molecular sieves per fluid ounce of beverage.

EXAMPLE V

Several forms of the Type 13X molecular sieves, i.e., 1/16 inch pellets, ⅛ inch pellets, 8 × 12 mesh beads, and 4 × 8 mesh beads, loaded as shown in Table 6 with carbon dioxide were employed in the carbonation of water in accordance with the procedures of Example I. Carbonation volumes at 1, 2, 4, 6 and 10 minutes (separate carbonation runs) were determined with the results summarized in Table 6 below.

Table 6

| Time of Carbonation (minutes) | Volumes of Carbonation | | | |
|---|---|---|---|---|
|  | 1/16" Pellet[1] | 1/8" Pellet[2] | 8 × 12 Bead[3] | 4 × 8 Bead[4] |
| 1 | 1.30 | 1.06 | 1.10 | 0.90 |
| 2 | 1.31 | 1.21 | 1.32 | 1.38 |
| 4 | 1.38 | 1.51 | 1.32 | 1.67 |
| 6 | 1.01 | 1.30 | 1.47 | 1.55 |
| 10 | 1.31 | 1.36 | 1.47 | 1.52 |

[1] Loaded with 13.2% $CO_2$
[2] Loaded with 13.7% $CO_2$
[3] Loaded with 14.8% $CO_2$
[4] Loaded with 15.2% $CO_2$ Substantially similar carbonation results are obtained when the molecular sieves employed are the powdered form of Type 13X.

Substantially similar carbonation results are obtained when 10 Angstrom acid-resistant molecular sieves having an $SiO_2Al_2O_3$ molar ratio of about 4 and 40% of the exchangeable metal ions removed or replaced with protons are employed.

EXAMPLE VI

The effect of carbonation with a mixture of 4 Angstrom and 10 Angstrom molecular sieves is demonstrated by employing such a mixture in the carbonation of water in accordance with the procedures and $CO_2$ load levels of Example I. Carbonation profiles are obtained using 24 grams of 4 Angstrom sieves, 24 grams of 10 Angstrom sieves and a mixture of 12 grams of 4 Angstrom sieves and 12 grams of 10 Angstrom sieves, all sieves being in the form of 8 × 12 beads. The resulting carbonation profiles clearly show that the sieve mixture provides greater initial carbon dioxide release and dissolution than the 4 Angstrom sieves but after about 10 minutes of carbonation yields solutions which are more strongly carbonation than those produced from 10 Angstrom sieves alone.

EXAMPLE VII

Type 13X molecular sieves in the form of 8 × 12 mesh beads and loaded to the extent of 15.9% by weight with carbon dioxide were utilized to carbonate sweetened solutions to demonstrate the effect on carbonation of dissolved sweeteners in a beverage liquid. A 10% sucrose solution, a 10% fructose solution, a 1.45% artificial sweetener (Poly Sweet R, a saccharin-based material, as presently available from the Guardian Chemical Corporation) solution and pure water were carbonated in accordance with the procedures of Example I. Carbonation profiles for these four solutions are summarized below in Table 7.

Table 7

| Time of Carbonation (minutes) | Pure Water | 10% Sucrose Solution | 10% Fructose Solution | 1.45% Poly Sweet R Solution |
|---|---|---|---|---|
| 1 | 1.10 | 0.26 | 0.53 | 1.17 |
| 2 | 1.32 | 0.61 | 1.06 | 1.26 |
| 4 | 1.32 | 1.30 | 1.52 | 1.39 |
| 6 | 1.47 | 1.27 | 1.36 | 1.50 |
| 10 | 1.47 |  | 1.43 | 1.35 |

The above seven examples clearly demonstrate the efficacy of crystalline aluminosilicate molecular sieves for beverage carbonation over a wide variety of sieve sizes, sieve quantities, sieve forms, sieve mixtures, and beverage solutions. The following examples illustrate several of the carbonation devices which can be employed to utilize this wide variety of molecular sieve carbonation techniques.

EXAMPLE VIII

A simple molecular sieve carbonation device was constructed as follows and used to prepare an orange-flavored carbonated beverage. Twelve grams of Type 13X molecular sieves in the form of spherical beads having a mesh size of 8 × 12 were loaded with carbon dioxide to the extent of 15.9% by weight and completely enclosed within commercially available open mesh polymeric netting, Type Q225 Delnet, presently manufactured by Hercules, Inc. Such an assembly is illustrated by FIG. 3 in the drawing.

By submerging this carbonation device below the surface of the solution comprising 9.1% by weight of a commercially available orange-flavored beverage powder (as presently sold under the trademark Kool-Aid) and 90.9% by weight of water, for approximately 10 minutes, a carbonated beverage containing about 1.03 volumes of dissolved carbon dioxide was obtained.

EXAMPLE IX

A simple carbonation device utilizing carbon dioxide-containing molecular sieves was constructed as follows: Following the procedures of Example VIII, 12 grams of charged Type 13X molecular sieves were enclosed within a Delnet Q225 open mesh netting mounted on a triangular frame as shown by FIG. 4 in the drawings. The structural netting assembly was attached to a handle so that the netting assembly could be held firmly in place with such handle. The enclosed molecular sieve were then held beneath the surface of an orange-flavored beverage solution to effectuate carbon dioxide release. Carbon dioxide dissolution and hence extent of carbonation was enhanced by using the structured netting assembly as a "swizzle stick" to agitate the liquid while carbon dioxide was evolving through the mesh of the netting assembly. Employment of this device yielded a carbonated beverage having approximately 1.24 volumes of dissolved carbon dioxide after 7 minutes of carbonation time. After 13 minutes of carbonation time a beverage having 1.65 volumes of dissolved carbon dioxide was obtained.

Substantially similar carbonation results are obtained if the Type 13X molecular sieve material is replaced with a crystalline aluminosilicate having a Zeolite Y structure and an 8 to 10 Angstrom pore size.

EXAMPLE X

A beverage carbonation device is constructed as follows: A polystyrene container having a volume of approximately 400 ml. is softened by heating. Five-micron powdered molecular sieves of the Type 13X are adhered to the soft inside surfaces of the plastic container to the extent necessary to cover such inside surfaces. The container is allowed to cool with the hardened plastic anchoring the sieves in place. The entire container is then contacted with carbon dioxide to load the molecular sieve powder to the extent of approximately 20% by weight of the sieves. When beverage liquid to be carbonated is poured into the container over ice, the beverage is carbonated to the extent of about 1 volume of dissolved carbon dioxide.

Substantially similar carbonation results are obtained when the powdered molecular sieves are replaced with 4 × 8 mesh Type 13X beads which are affixed to the inside surfaces of the drinking vessel as shown by FIG. 5 in the drawing.

EXAMPLE XI

A beverage carbonation device is constructed as follows: At the bottom of a cylindrical polystyrene container similar to that described in Example X, there is placed a cylindrical disc molded from powdered Type 13X molecular sieves. This disc is affixed to the bottom of the polystyrene container as shown by FIG. 6 in the drawing. The molded molecular sieve disc is then loaded with carbon dioxide to the extent of approximately 20% by weight of the disc. When beverage liquid is poured into the container, the beverage is carbonated to the extent of about one volume of dissolved carbon dioxide. The flat disc provides high initial carbon dioxide release from the sieve material near its upper surfaces and also provides sustained carbon dioxide release from the sieve material further inside the disc. The initial carbon dioxide release is inhibited if, prior to insertion in the container, the disc is coated with a film of polyvinyl alcohol.

EXAMPLE XII

A tablet made of Type 13X molecular sieves with 20% by weight of a clay binder and pressed into a 1½ inch diameter disc weighing 11.47 grams when charged with $CO_2$ (16.04% $CO_2$) was placed in a 400 ml. beaker containing 8 fluid ounces of water at 35° F. After 4 minutes, 1.22 volumes of carbonation were measured.

Carbonation greater than about two volumes can be obtained if carbonation takes place in a closed vessel and the pressure during carbonation is allowed to rise to about three atmospheres.

EXAMPLE XIII

A beverage carbonation device was constructed as follows: Forty-eight grams of 8 × 12 mesh Type 13X molecular sieves were loaed to the extent of 16% by weight with carbon dioxide and mixed with 95 grams of a dry orange-flavored beverage mix. This sieve and beverage mix combination was placed in a spouted container having a volume of approximately 1900 milliliters. A sheet of polymeric netting (Delnet Type Q225 from Hercules, Inc.) was then placed across the spout of the container.

946 milliliters of water at 36° F was placed in the container and the resulting liquid mixture inside was agitated by shaking for about 2 minutes. After beverage formation and carbonation were completed, the carbonated beverage was decanted through the netting. The resulting beverage contained approximately 1.4 volumes of dissolved carbon dioxide. Substantially similar carbonation results are obtained when the carbonation chamber is a flexible bag as shown by FIGS. 7, 8 and 9 in the drawing.

The above Examples VIII – XIII demonstrate carbonation devices which can be employed to carry out the molecular sieve carbonation process of the instant invention.

A variety of dry flavorings, colorings and additives can be mixed with carbon dioxide loaded molecular sieves to form compositions which, when added to water form flavorful carbonated beverages. Such flavorings, colorings and additives are referred to herein as dry beverage mixes. Typical ingredients in dry beverage mixes can include flavorings, either natural or artificial, such as cola, lemon, lime, orange, grape, cherry, root beer, beer, ginger ale, wine tea, coffee, etc.; colorings, particularly when using artificial flavorings, of any suitable nature; sweetening agents, either natural or artificial such as sugars of the glucose, fructose and sucrose (the former two being preferred over the latter due to the aforementioned effect on carbonation rate), saccharin (which exhibits less inhibition of carbonation rates with molecular sieve carbonation than the natural sugars), etc. Various other additives well known in the beverage art such as thickeners and preservatives can also be added.

One highly satisfactory way to provide point-of-use carbonated beverages is to package a composition consisting of carbon dioxide loaded molecular sieves of the hereinbefore described types and a dry beverage mixed in the forms and devices herein described or simply in sealed packets for use in reusable pitchers with netting or other separation means at the outlet thereof. Examples of beverages formed from such compositions include the following:

EXAMPLE XIV

A teaspoon of a commercial instant tea and 12 grams of Type 13X molecular sieves in bead form (approximately ⅛ inch spheres) loaded with carbon dioxide to about 14.8% by weight are added to 8 fluid ounces of chilled (37° F.) water. A carbonated tea beverage containing about 1.56 volumes of dissolved carbon dioxide is obtained.

Substantially similar results are obtained if the dry beverage mix contains two teaspoons of sucrose in addition to the instant tea.

Substantially similar results are also obtained if the tea and/or sugar are coated on the beads of molecular sieve material.

EXAMPLE XV

A dry beverage mix consisting of 44 grams of sugar, 2.4 grams of freeze-dried coffee solids, 5.15 grams of caramel coloring (Sethness High Acid Proof 150) and 0.02 grams of a food grade silicone anti-foaming agent is mixed with 49 grams of NaY molecular sieves (in 1/16 inch extruded pellet form) loaded to 12.9% by weight with carbon dioxide and the composition is mixed in 2100 grams of cool water. A coffee beverage with 1.44 volumes of dissolved carbon dioxide results.

Substantially similar results are obtained if the molecular sieves are coated with a water-soluble material such as hydroxypropyl cellulose to allow vigorous mixing to dissolve the coffee while delaying the release of the carbon dioxide until after said mixing.

EXAMPLE XVI

Twenty-four grams of a dry beverage mix of the following composition:
- 95.55% sucrose
- 2.5% citric acid
- 0.5% gum arabic
- 0.5% natural lemon flavor (dehydrated)
- 0.5% mono- and diglycerides
- 0.1% soybean and cottonseed oil
- 0.25% lemon juice dried with corn syrup
- 0.1% artificial color are mixed with 8 grams of CaY molecular sieves in 4 × 8 mesh bead form which are loaded to 13.5% by weight carbon dioxide. The mixture is added to 8 fluid ounces of water and ice and stirred until the sugar dissolves. A carbonated lemonade beverage with about 1.4 volumes of dissolved carbon dioxide results.

Liquid beverage mixes (i.e, concentrates, extracts, syrups, etc.) of various types can also be pre-packaged and used with carbon dioxide-loaded molecular sieves. Examples of this aspect of the present invention are:

EXAMPLE XVII

Four fluid ounces of a commercial cola fountain syrup (Coca-Cola) are placed in one compartment of a bag such as that illustrated in FIG. 10. Eighty grams of CaX sieves as 8 × 12 mesh spherical beads are loaded with carbon dioxide to 13.7% by weight, and placed in the other compartment of the bag. The bag is opened and the sieves and syrup are placed in a seltzer bottle of about 20 fluid ounce capacity. Five 1×1×1 inch ice cubes are added. The bottle is filled with water and tightly capped. After about 10 minutes, a carbonated cola beverage with about 3 volumes of dissolved carbon dioxide (at about 2 atmospheres pressure) results.

Dry beverage mixes in suitable quantities can also be used with the above sieve material and seltzer bottle to form carbonated beverages of other types with about 3 volumes of dissolved carbon dioxide.

EXAMPLE XVIII

A two compartment bag 6 × 10 inches of the type shown in FIG. 10 of the drawings is made of 1 mil polyethylene. 1.5 Grams of a liquid cola flavored concentrate (Felton International Flavors PG-189), 2.5 grams of carmel coloring (Sethness High Acid Proof 150), 0.8 grams of 80% concentrated phosphoric acid, 110 grams of a 30° Baume sugar syrup and 880 grams of water are premixed and placed in one compartment of a bag such as the one illustrated in FIG. 10. Within the bag and on the other side of the weak medial seal, 48 grams of Type 10X sieves in ⅛ inch diameter extruced pellet form and loaded to 13.4% with carbon dioxide are placed. The medial seal is separated and the bag is stored at 40° F. for about 4 hours. The resulting beverage, carbonated to about 2 volumes of carbon dioxide is served by pouring through an 8 mesh netting.

Many modifications can be made to the present invention as herein described without departing from the spirit and scope thereof and within the following claims.

What is claimed is:

1. A beverage carbonation device which comprises a water and gas permeable container, a dry beverage mix, and an amount effective to carbonate a beverage of a porous crystalline aluminosilicate material having absorbed therein an amount of carbon dioxide equal to at least about 5% by weight of said crystalline aluminosilicate material; said crystalline aluminosilicate material and said dry beverage mix being enclosed in said container; whereby when said device is submerged in a body of beverage-making liquid to be carbonated, said adsorbed carbon dioxide is released to provide beverage carbonation.

2. A device in accordance with claim 1 wherein the crystalline aluminosilicate material is selected from the group consisting of Zeolite X, Zeolite Y and Zeolite A and has pore sizes of from about 3 Angstroms to about 10 Angstroms.

3. A device in accordance with claim 2 wherein the water and gas-permeable container is in the form of a flexible, inert netting having mesh openings large enough to permit substantially uninhibited passage of carbon dixoide and small enough to retain the crystalline aluminosilicate material.

4. A device in accordance with claim 3 wherein the crystalline aluminosilicate material is in the form of 4 × 8 mesh beads and the flexible inert netting has a mesh size greater than 8.

5. A device in accordance with claim 3 wherein the crystalline aluminosilicate material is in the form of 8 × 12 mesh beads and the flexible, inert netting has a mesh size greater than 12.

6. A device in accordance with claim 2 wherein the water and gas-permeable container is affixed to a frame and handle assembly.

7. A device in accordance with claim 6 wherein the water and gas-permeable container is in the form of a flexible, inert netting having mesh openings large enough to permit substantially uninhibited passage of carbon dioxide and small enough to retain the crystalline aluminosilicate material.

8. A device in accordance with claim 7 wherein the crystalline aluminosilicate material is in the form of 4 × 8 mesh beads and the flexible inert netting has a mesh size greater than 8.

9. A device in accordance with claim 7 wherein the crystalline aluminosilicate material is in the form of 8 × 12 mesh beads and the flexible, inert netting has a mesh size greater than 12.

10. A beverage carbonation device which comprises a container, a dry beverage mix, and an amount effective to carbonate a beverage of a porous crystalline aluminosilicate material having adsorbed therein an amount of carbon dioxide equal to at least about 5% by weight of said aluminosilicate material; said aluminosilicate material and dry beverage mix being enclosed in the container with said aluminosilicate material being affixed to the inside surfaces of said container; whereby when the container is filled with a beverage-making liquid, making contact with said aluminosilicate material, said adsorbed carbon dioxide is released to provide beverage carbonation.

11. A device in accordance with claim 10 wherein the crystalline aluminosilicate material is selected from the group consisting of Zeolite X, Zeolite Y and Zeolite A and has pore sizes of from about 3 Angstrom to about 10 Angstroms.

12. A device in accordance with claim 11 wherein enough crystalline aluminosilicate material is attached to the container to provide from about 0.5 to about 4 grams of crystalline aluminosilicate material per fluid ounce capacity of said container.

13. A beverage carbonation device which comprises a container, a dry beverage mix, and an amount effective to carbonate a beverage of a single molded block of porous crystalline aluminosilicate material having adsorbed therein an amount of carbon dioxide equal to at least 5% by weight of said crystalline aluminosilicate material, said block having a thickness of from about 0.001 inch to about 3 inches; said block and dry beverage mix being enclosed in said container with said block being affixed in said container; whereby when a beverage-making liquid is introduced in said container making contact with said block, said adsorbed carbon dioxide is released to provide beverage carbonation.

14. A device in accordance with claim 13 wherein the crystalline aluminosilicate material is selected from the group consisting of Zeolite X, Zeolite Y and Zeolite A and has pore sizes of from about 3 Angstroms to about 10 Angstroms.

15. A device in accordance with claim 14 wherein enough crystalline aluminosilicate material is affixed to the container to provide from about 0.5 to about 4 grams of crystalline aluminosilicate material per fluid ounce capacity of said container.

16. A beverage carbonation device which comprises a container having therein an open carbonation chamber containing a dry beverage mix, an amount effective to carbonate a beverage of a porous crystalline aluminosilicate material and carbon dioxide for beverage carbonation; said crystalline aluminosilicate material having adsorbed therein at least 5% by weight of said carbon dioxide, said carbonation chamber having a screening means affixed therein to prevent passage of the crystalline aluminosilicate material from said carbonation chamber; whereby when said container is filled with a beverage liquid making contact with said aluminosilicate material, said adsorbed carbon dioxide is released to provide beverage carbonation.

17. A device in accordance with claim 16 wherein the crystalline aluminosilicate material is selected from the group consisting of Zeolite X, Zeolite Y and Zeolite A and has pore sizes of from about 3 Angstroms to about 10 Angstroms.

18. A device in accordance with claim 17 wherein the crystalline aluminosilicate material is present in a quantity sufficient to provide from about 0.5 to about 4 grams of crystalline aluminosilicate material per fluid ounce capacity of said carbonation chamber.

19. A device in accordance with claim 17 wherein the crystalline aluminosilicate material is in the form of 4 × 8 mesh beads and the screening means has a mesh size greater than 8.

20. A device in accordance with claim 17 wherein the crystalline aluminosilicate material is in the form of 8 × 12 mesh beads and the screening means has a mesh size greater than 12.

21. A package comprising a two-compartmented bag, one compartment of said bag containing a potable aqueous solution and the other compartment of said bag containing an effective amount to carbonate the potable solution of porous crystalline aluminosilicate material, said material having absorbed therein at least about 5% by weight of carbon dioxide.

22. The carbonated beverage system of claim 21 wherein said potable aqueous solution is a fully diluted uncarbonated beverage and wherein said compartments are separated by a breakable seal whereby said solution can be carbonated in said bag by the breaking of said seal.

23. A beverage carbonation device which comprises a rod-like support member, an amount effective to carbonate a beverage of a molded disc of porous crystalline aluminosilicate material and carbon dioxide; said porous crystalline aluminosilicate material having adsorbed therein at least about 5% by weight of said carbon dioxide; said disc being coated with a dry beverage mix; said disc being attached to one end of said support member; whereby when said disc is placed in a body of beverage-making liquid to be carbonated, said adhered carbon dioxide is released to provide beverage carbonation.

* * * * *

UNITED STATES PATENT AND TRADEMARK OFFICE
CERTIFICATE OF CORRECTION

PATENT NO. : 4,025,655                                    Page 1 of 2

DATED : May 24, 1977

INVENTOR(S) : David D. Whyte and Ronald L. Sampson

It is certified that error appears in the above-identified patent and that said Letters Patent are hereby corrected as shown below:

| Column | Line | |
|---|---|---|
| 1 | 21 | "absorbed" should be -- adsorbed -- |
| 5 | 58 | "$SiO_2Al_2O_3$" should be -- $SiO_2/Al_2O_3$ -- |
| 6 | 34 | "$Na_{12}[(AlO_2)_{12}(SiO_2)_{106}[\cdot 27H_2).$" should be -- $Na_{12}[(AlO_2)_{12}(SiO_2)_{106}]\cdot 27H_2O.$ -- |
| 6 | 45 | "705" should be -- 70% -- |
| 7 | 28 | "100,200" should be -- 100, 200 -- |
| 7 | 41 | "absorbed" should be -- adsorbed -- |
| 7 | 44 | "absorption" should be -- adsorption -- |
| 7 | 52 | "absorption" should be -- adsorption -- |
| 7 | 60 | "absorbed" should be -- adsorbed -- |
| 7 | 63 | "absorb" should be -- adsorb -- |
| 10 | 33 | "ore" should be -- pore -- |
| 16 | 40 | "amout" should be -- amount -- |
| 19 | 8 | "carbonation" should be -- carbonated -- |
| 20 | 4 | "sieve" should be -- sieves -- |
| 21 | 11 | "loaed" should be -- loaded -- |
| 21 | 56 | "mixed" should be -- mix -- |
| 22 | 36 | "0.1% artificial color" should be on a separate line. The rest of the text "are mixed...carbon dioxide results" should be brought to the left hand margin. |

UNITED STATES PATENT AND TRADEMARK OFFICE
CERTIFICATE OF CORRECTION

PATENT NO. : 4,025,655

DATED : May 24, 1977

INVENTOR(S) : David D. Whyte and Ronald L. Sampson

It is certified that error appears in the above-identified patent and that said Letters Patent are hereby corrected as shown below:

| Column | Line | |
|---|---|---|
| 23 | 24 | "absorbed" should be -- adsorbed -- |
| 24 | 17 | "Angstrom" should be -- Angstroms -- |
| 25 | 15 | "effective amount" should be -- amount effective -- |

Signed and Sealed this

Eighteenth Day of October 1977

[SEAL]

Attest:

RUTH C. MASON
Attesting Officer

LUTRELLE F. PARKER
Acting Commissioner of Patents and Trademarks